(12) United States Patent
Bennett

(10) Patent No.: US 9,982,418 B2
(45) Date of Patent: May 29, 2018

(54) GATE STRAINER THAT FITS INTO A GATE VALVE CURB BOX

(75) Inventor: Barry S. Bennett, Braintree, MA (US)

(73) Assignee: Barry S. Bennett, Braintree, MA (US)

( * ) Notice: Subject to any disclaimer, the term of this patent is extended or adjusted under 35 U.S.C. 154(b) by 0 days. days.

(21) Appl. No.: 13/573,151

(22) Filed: Aug. 27, 2012

(65) Prior Publication Data

US 2014/0054236 A1 Feb. 27, 2014

(51) Int. Cl.
*E03B 7/09* (2006.01)
*C02F 103/00* (2006.01)

(52) U.S. Cl.
CPC ........ *E03B 7/095* (2013.01); *C02F 2103/001* (2013.01); *C02F 2303/24* (2013.01)

(58) Field of Classification Search
None
See application file for complete search history.

(56) References Cited

U.S. PATENT DOCUMENTS

| | | | | |
|---|---|---|---|---|
| 381,990 A * | 5/1888 | Driller | ........................ | 210/318 |
| 414,240 A * | 11/1889 | Norton | .................... | B63B 13/00 |
| | | | | 114/183 R |
| 492,227 A * | 2/1893 | O'Neil | ......................... | 220/301 |
| 1,115,016 A * | 10/1914 | Pheils | ........................... | 220/484 |
| 1,905,856 A * | 4/1933 | Haase et al. | .................. | 52/100 |
| 2,491,796 A * | 12/1949 | Baume | ................... | B01D 35/02 |
| | | | | 210/448 |
| 2,732,946 A * | 1/1956 | Schaub | .................. | B05B 15/40 |
| | | | | 210/459 |
| 3,322,282 A * | 5/1967 | Lyman | ................. | A47L 15/4206 |
| | | | | 134/110 |
| 3,450,207 A * | 6/1969 | Hirsch | ................... | E21B 43/086 |
| | | | | 166/233 |
| 3,731,815 A * | 5/1973 | Collingwood | ......... | B01D 29/58 |
| | | | | 210/496 |
| 4,460,462 A * | 7/1984 | Arneson | ............... | E04H 4/1236 |
| | | | | 210/163 |
| 4,495,073 A * | 1/1985 | Beimgraben | ......... | E21B 21/002 |
| | | | | 166/227 |

(Continued)

FOREIGN PATENT DOCUMENTS

FR 2380381 A1 * 9/1978 ............... E03B 7/08

OTHER PUBLICATIONS

Derwent English language Abstrat for French 2,380,381 A1; two pages.*

*Primary Examiner* — Robert James Popovics
(74) *Attorney, Agent, or Firm* — Limin Wen

(57) ABSTRACT

A gate valve curb box strainer collects debris introduced through a street level cover, minimizing debris build up in the gate valve access pipe of the curb box. Water passes through the curb box strainer, while the strainer catches debris that naturally builds up over time via the street level cover. When a worker removes the cover to exercise the valve, he need only lift the gate strainer out of the access pipe and shake the debris out of it. There is no need to take extra time digging out or vacuuming out the debris. In an emergency situation such as accessing the valve for a fire hydrant or during a water/sewer main break, this could save valuable time. After the valve has been exercised, the empty gate valve curb box strainer is dropped back in place prior to covering the gate valve curb box with the street level cover.

3 Claims, 4 Drawing Sheets

(56) References Cited

U.S. PATENT DOCUMENTS

| | | | | |
|---|---|---|---|---|
| D279,379 S * | 6/1985 | Uram | | D15/138 |
| 4,682,907 A * | 7/1987 | Gaudin | | E02D 29/14 |
| | | | | 210/164 |
| 5,197,455 A * | 3/1993 | Tessien | | 126/25 B |
| 5,897,787 A * | 4/1999 | Keller | | B01D 29/33 |
| | | | | 210/767 |
| 5,925,241 A * | 7/1999 | Aldridge | | B01D 15/00 |
| | | | | 210/163 |
| 5,951,200 A * | 9/1999 | Barton | | 404/25 |
| 5,988,209 A * | 11/1999 | Hardy | | F16K 31/46 |
| | | | | 137/368 |
| 6,026,550 A * | 2/2000 | Silano | | B25B 13/48 |
| | | | | 29/239 |
| 6,200,484 B1 * | 3/2001 | McInnis | | E03F 1/00 |
| | | | | 210/164 |
| 6,217,757 B1 * | 4/2001 | Fleischmann | | B01D 24/08 |
| | | | | 210/163 |
| 6,254,770 B1 * | 7/2001 | Remon | | B01D 29/03 |
| | | | | 210/163 |
| 6,743,354 B1 * | 6/2004 | Evans, Jr. | | E03F 1/00 |
| | | | | 210/164 |
| 6,939,465 B2 * | 9/2005 | Dupre | | 210/248 |
| 6,997,636 B2 * | 2/2006 | Tremouilhac | | E03F 5/046 |
| | | | | 210/163 |
| 7,186,333 B2 * | 3/2007 | Kluge | | E03F 1/00 |
| | | | | 210/164 |
| 7,473,359 B1 * | 1/2009 | Barrett, II | | 210/232 |
| 7,485,218 B2 * | 2/2009 | Dussich, I | | E03F 1/00 |
| | | | | 210/130 |
| 7,540,953 B2 * | 6/2009 | Fitzgerald | | E03F 5/0404 |
| | | | | 210/162 |
| 7,615,148 B1 * | 11/2009 | Gentry | | B01D 35/02 |
| | | | | 210/170.07 |
| 7,748,927 B2 * | 7/2010 | Neathery | | E02D 29/14 |
| | | | | 404/25 |
| 7,875,178 B2 * | 1/2011 | Ashliman | | B01D 24/007 |
| | | | | 210/323.1 |
| 7,883,290 B1 * | 2/2011 | Ross | | E02D 29/1427 |
| | | | | 210/163 |
| 7,959,799 B2 * | 6/2011 | Happel | | B01D 21/0012 |
| | | | | 210/163 |
| 8,012,346 B2 * | 9/2011 | Peters, Jr. | | C02F 1/004 |
| | | | | 210/163 |
| 8,025,079 B2 * | 9/2011 | Wander | | E03F 5/042 |
| | | | | 138/90 |
| 8,029,667 B2 * | 10/2011 | Santinon | | B60K 15/04 |
| | | | | 210/172.6 |
| 8,168,064 B2 * | 5/2012 | Peters, Jr. | | E03F 5/06 |
| | | | | 210/163 |
| 8,182,702 B2 * | 5/2012 | Al-Sannaa | | 210/806 |
| 8,216,479 B2 * | 7/2012 | Lambert, V | | E03F 1/002 |
| | | | | 210/170.03 |
| 8,237,576 B2 * | 8/2012 | Wander | | E02D 29/1427 |
| | | | | 340/632 |
| D672,438 S * | 12/2012 | Noel | | D23/261 |
| 8,438,731 B2 * | 5/2013 | Peters, Jr. | | E03F 5/06 |
| | | | | 210/163 |
| D694,852 S * | 12/2013 | Gordon | | D23/209 |
| 8,608,956 B2 * | 12/2013 | Moulton | | E03F 5/0404 |
| | | | | 210/163 |
| 8,906,232 B2 * | 12/2014 | McInnis | | E03F 5/14 |
| | | | | 210/163 |
| 9,051,192 B2 * | 6/2015 | Kent | | E03F 5/0404 |
| 9,322,156 B2 * | 4/2016 | McInnis | | E03F 5/0404 |
| 9,546,466 B2 * | 1/2017 | Wander | | E02D 29/1481 |
| 2001/0030150 A1 * | 10/2001 | Remon | | B01D 29/03 |
| | | | | 210/163 |
| 2002/0166291 A1 * | 11/2002 | Campbell et al. | | 52/20 |
| 2004/0031747 A1 * | 2/2004 | Dupre | | 210/411 |
| 2005/0103694 A1 * | 5/2005 | Rost | | E03F 1/00 |
| | | | | 210/164 |
| 2005/0183997 A1 * | 8/2005 | Happel | | B01D 21/0012 |
| | | | | 210/163 |
| 2005/0199537 A1 * | 9/2005 | Kluge | | E03F 1/00 |
| | | | | 210/164 |
| 2006/0207922 A1 * | 9/2006 | Dussich | | E03F 1/00 |
| | | | | 210/164 |
| 2006/0260688 A1 * | 11/2006 | Green | | 137/371 |
| 2007/0181486 A1 * | 8/2007 | Ashliman | | B01D 24/007 |
| | | | | 210/323.1 |
| 2008/0073277 A1 * | 3/2008 | Paoluccio | | B01D 21/0012 |
| | | | | 210/691 |
| 2010/0155345 A1 * | 6/2010 | Al-Sannaa | | B01D 35/02 |
| | | | | 210/806 |
| 2011/0155672 A1 * | 6/2011 | McInnis | | E03F 5/04 |
| | | | | 210/747.3 |
| 2011/0278237 A1 * | 11/2011 | McInnis | | E03F 5/14 |
| | | | | 210/767 |
| 2012/0145612 A1 * | 6/2012 | McInnis | | E03F 5/0404 |
| | | | | 210/163 |
| 2013/0186811 A1 * | 7/2013 | Kaiser | | E03F 5/0404 |
| | | | | 210/163 |
| 2014/0054236 A1 * | 2/2014 | Bennett | | 210/747.3 |
| 2014/0238915 A1 * | 8/2014 | McInnis | | E03F 5/0404 |
| | | | | 210/170.03 |

\* cited by examiner

GATE STRAINER THAT FITS INTO A GATE VALVE CURB BOX

BACKGROUND OF THE INVENTION

Every water supply system has valves that regulate, stop, or start the flow of water in water supply distribution lines. If a valve is not used over a period of time, it can corrode and become inoperable. In order to ensure that these valves can be operated whenever needed (particularly in emergency situations), they must be routinely exercised by opening and closing the valve.

The process of exercising a valve first involves removing the accumulated sediment and dirt from the gate valve curb box, i.e., the street-level cover and connecting pipe that provides access to the valve to be exercised. Over time, the gate valve curb box can become thickly clogged, requiring a worker to take extra time to dig out the sediment or use a utility vacuum cleaner.

SUMMARY OF A PREFERRED EMBODIMENT OF THE INVENTION

A novel gate valve curb box strainer is provided, that can be installed below the street-level cover of the gate valve curb box, to collect debris introduced through the street level cover, in order to effectively minimize debris build up in the gate valve access pipe of the curb box. The design allows water to pass through the curb box strainer, while catching the sand, stones, road salt, and asphalt that naturally build up over time via the street level cover. When a worker removes the cover to exercise the valve, he or she need only lift the gate strainer out of the access pipe and shake the debris out of it. There is no need to take extra time digging out or vacuuming out the debris. In an emergency situation such as accessing the valve for a fire hydrant or during a water/sewer main break, this could save valuable time. After the valve has been exercised, the empty gate valve curb box strainer is dropped back in place prior to covering the gate valve curb box with the street level cover.

The gate valve curb box strainer effectively saves labor cost by allowing quicker access to the valve. It also reduces the variability of time it takes to access each valve, making it easier to predict how much time it will take to exercise a given number of valves. This will help municipalities with creating and budgeting a valve exercise schedule. It is recommended that gate box strainers of the present invention may beneficially be used by municipalities and their water and sewer distribution contractors.

DETAILED DESCRIPTION OF A PREFERRED EMBODIMENT OF THE INVENTION

Figure 1:
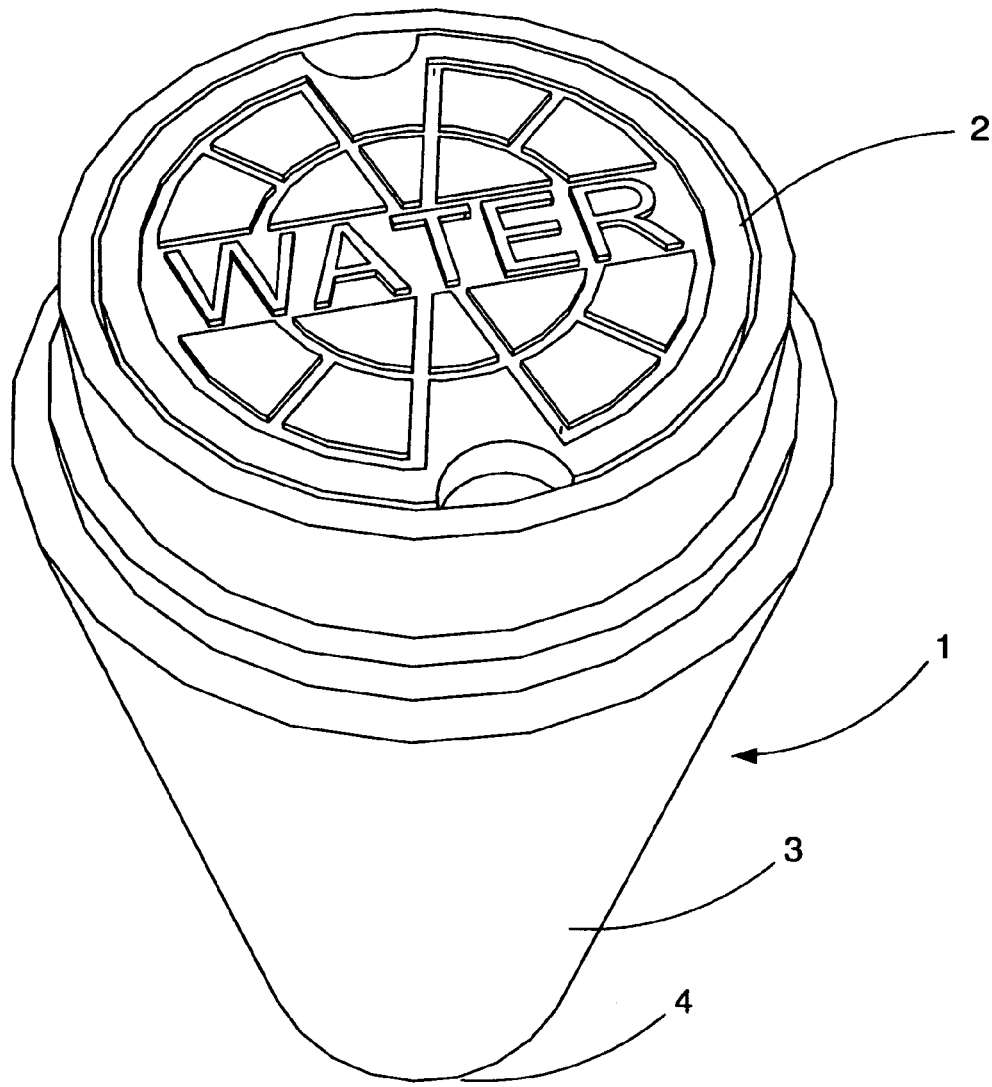
FIG. 1 shows a conventional gate valve curb box 1 having a street level cover 2 and a descending access pipe 3 having a bottom portion 4 adjacent a gate valve not shown.
Figure 2:
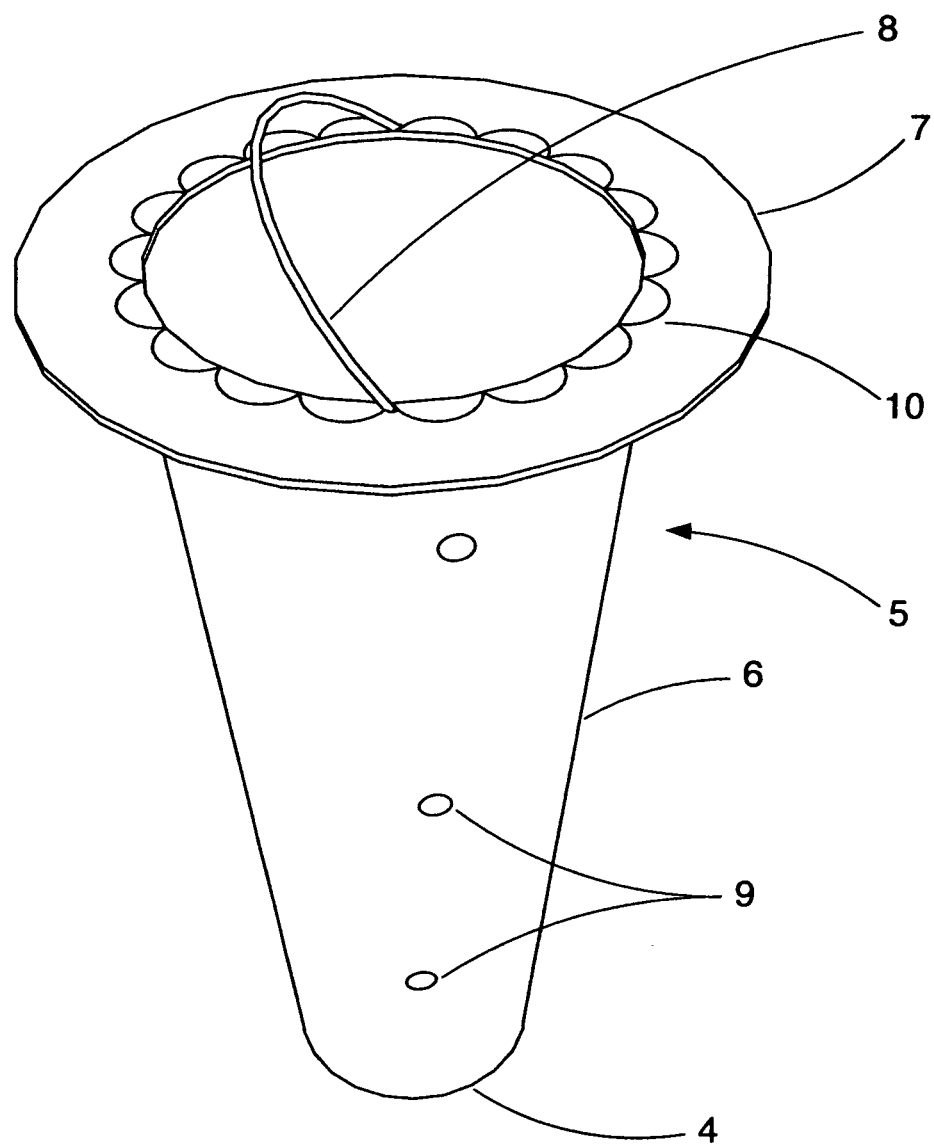
FIG. 2 illustrates the gate valve curb box strainer 5 (hereinafter curb box strainer) of the present invention, positioned over gate valve 11.
Figure 3:
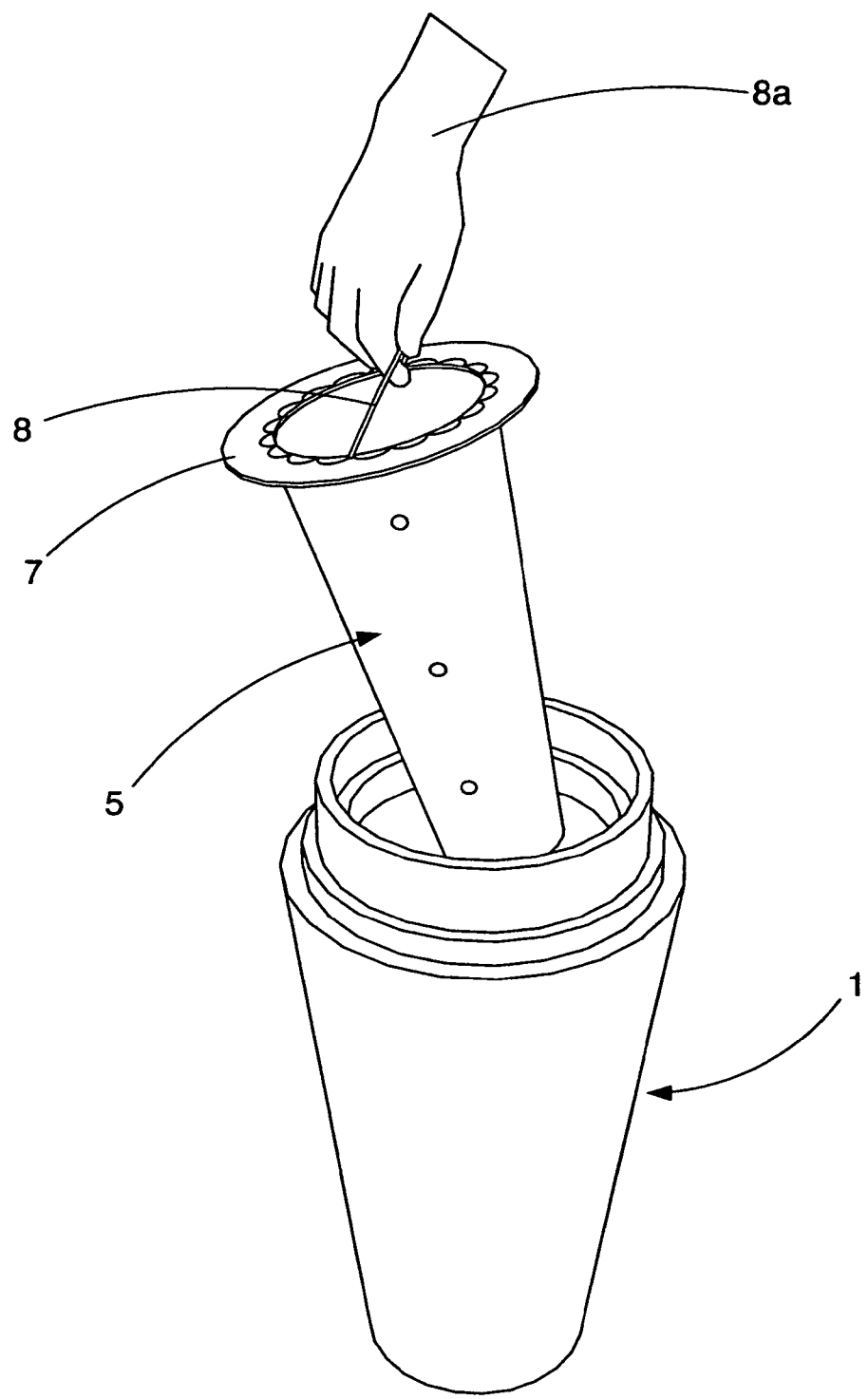
FIG. 3 shows the curb box strainer being inserted into the curb box.

Referring now to FIGS. 1-3, in order to access the curb box 1, the street level cover 2 is removed and the curb box strainer 5 is inserted into the curb box as indicated in FIG. 3 by grasping a conventional flip-over handle 8 by the worker's fingers 8a, which handle normally rests upon an upper rim 7 of the curb box.

As shown in FIG. 2, the curb box strainer 5 has a downwardly converging wall portion 6 that is affixed to rim 7 by, for example, a number of weld spots 10. The downwardly converging wall portion 6 preferably conforms to the slope of the converging wall portions 3 of the curb box 1 shown in FIG. 1 in order to maximize the holding capacity of the aforesaid debris carried by water that builds up in time via the edges of the cover 2.

Figure 4:
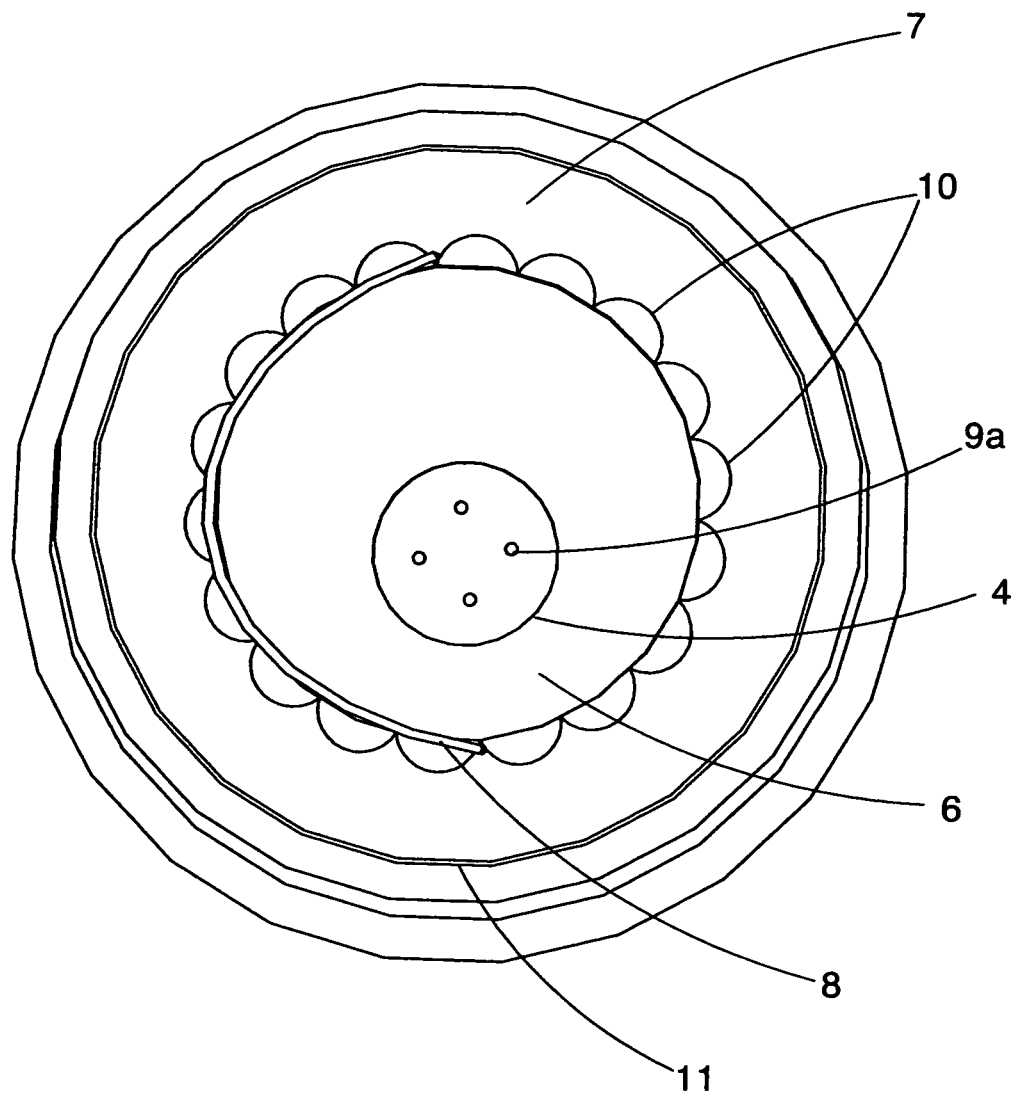
FIG. 4 shows the curb box strainer resting on a rim portion of the curb box after insertion.

FIG. 4 shows the strainer seated upon an upper rim of the curb box. Note that the conventional flip-over handle 8 is now resting upon rim 7 of the strainer, so that the handle does not get in the way of debris carried by water flowing downwardly via the street level cover.

Thus a gate valve curb box strainer 5 is provided, configured to be positioned within a gate valve curb box 1, the curb box strainer having wall portions 6 for accumulating debris, and having a first set of apertures 9 in the side wall portions in FIG. 2, and a second set of apertures 9a in the bottom wall portions of the strainer shown in FIG. 4. These apertures within the strainer enable water to pass downwardly through the apertures while blocking debris, and thus holding the debris within the strainer to be later disposed of when the worker lifts the strainer out of the curb box by grasping the handle 8.

Thus, the method of the invention allows for quick access to a gate valve 11 (FIG. 2) beneath a gate valve curb box 1 (FIG. 1) in order to exercise the gate valve and comprises the steps of:

(a) providing a gate valve curb box strainer 5 configured to be positioned within a gate valve curb box 1, said curb box strainer having wall portions 6, (FIG. 2) for accumulating debris carried by water flowing into the strainer via the gate box cover 2 (FIG. 1), and apertures within the strainer for enabling water to pass downwardly through said apertures, together with a flip-over handle 8 for enabling the curb box strainer to be lifted out of said gate valve curb box in order to dispose of the debris;

(b) installing said curb box strainer 5 below a street level cover 2 for a time period sufficient to result in accumulation of debris captured by the curb box strainer;

(c) removing said curb box strainer after said time period and removing the debris from the curb box strainer; and (d) reinstalling said curb box strainer into said gate valve curb box.

My preferred prototype had the following characteristics. Generally, gate valve curb boxes have similar standard sizes and shapes. This permits the gate strainer to also be constructed in a standard size that will fit into most gate valve curb boxes. The gate valve strainer is 8" in length, cup shape in design with multiple 1/64" strainer holes. These holes allow water to pass through while collecting debris. The lip or rim of the gate valve strainer is welded to the upper cup or rim portions and has a stainless steel flip-over handle attached to allow for easy installation and removal of the gate valve strainer. The gate valve strainer is constructed of 60-gauge aluminum that is both corrosion resistant and very durable under exposure to a wide range of water and soil conditions.

The prototype strainer has a height of eight inches, a top rim diameter of six inches and a bottom diameter of three inches The stainless steel wire flip-over handle 8 is of a conventional design widely used in commerce. See for example U.S. Pat. No. 4,561,239 issued to Cook.

While the invention has been described in connection with preferred embodiments, the description is not intended to limit the scope of the invention to the particular forms set forth, but on the contrary, it is intended to cover such alternatives, modifications, and equivalents as may be included within the spirit and scope of the invention as indicated by the language of the appended claims.

What is claimed:

1. A valve curb box assembly comprising:
   a below grade curb box including an internal ledge spaced from an uppermost open end of said curb box;
   a valve in a lower portion of the curb box accessible through said box for regulation of fluid flow in a supply distribution line;
   a street level cover; and
   a curb box strainer constructed of a 60-gauge aluminum, for capturing debris entering said curb box, said strainer including:
   a cup-shaped downwardly converging wall portion including multiple $\frac{1}{64}$" holes and being 8" in length;
   a rim welded to an upper end of said cup-shaped downwardly converging wall portion; and
   a handle attached to said rim;
   wherein said rim is seated on said internal ledge with said cup-shaped downwardly converging wall portion being suspended from said rim and extending down into said curb box, and said street level cover is seated on said uppermost open end of said curb box.

2. The valve curb box assembly of claim 1 wherein the valve is a gate valve.

3. The valve curb box assembly of claim 1 wherein the cup-shaped downwardly converging wall portion conforms to the scope of converging wall portions of the curb box in order to maximize the holding capacity of said debris.

* * * * *